United States Patent [19]

Nagazumi

[11] Patent Number: 5,084,901
[45] Date of Patent: Jan. 28, 1992

[54] SEQUENTIAL CHIRP MODULATION-TYPE SPREAD SPECTRUM COMMUNICATION SYSTEM

[75] Inventor: Yasuo Nagazumi, Tokyo, Japan
[73] Assignee: G.D.S. Co., Ltd., Japan
[21] Appl. No.: 455,077
[22] Filed: Dec. 22, 1989

[30] Foreign Application Priority Data

Dec. 26, 1988 [JP] Japan .................... 63-325951

[51] Int. Cl.$^5$ ............................................. H04L 27/30
[52] U.S. Cl. ........................................... 375/1; 380/34
[58] Field of Search ............... 375/1; 342/17, 18, 132, 342/200, 201; 380/34, 38, 39

[56] References Cited

U.S. PATENT DOCUMENTS

| | | | |
|---|---|---|---|
| 1,642,663 | 9/1927 | Chafee | 380/32 |
| 1,690,719 | 11/1928 | Chafee et al. | 380/32 |
| 2,166,991 | 7/1939 | Guanella | 342/428 |
| 2,292,387 | 8/1942 | Markey et al. | 380/34 |
| 2,495,727 | 1/1950 | Hutchinson | 380/39 |
| 3,981,012 | 9/1976 | Brault et al. | 342/201 |
| 4,616,364 | 10/1986 | Lee | 375/1 |
| 4,631,541 | 12/1986 | Prickett et al. | 342/201 X |

Primary Examiner—Bernarr E. Gregory
Attorney, Agent, or Firm—King and Schickli

[57] ABSTRACT

A sequential chirp modulation-type spread spectrum communication system is disclosed relating to the FH-type which realizes fine transmission quality at low cost. It comprises at least primary and secondary digital sine wave generators of a program controlled-type mounted respectively on a transmitter of a transmitting side and a receiver of a receiving side. The primary sine wave generator generates a sine wave having a frequency which changes almost continuously and Pseudo-Random in the specified range of frequency according to the program. The primary digital sine wave generator also transmits the sine wave from the transmitting side after modulating the sine wave with the signals which should be transmitted. The secondary digital sine wave generator generates a sine wave having a frequency in which the specified frequency is a constant distance from the receiving signal frequency and receiving the receiving signal after demodulating.

6 Claims, 8 Drawing Sheets

TYPICAL EXAMPLE OF SS-SC RX UNIT

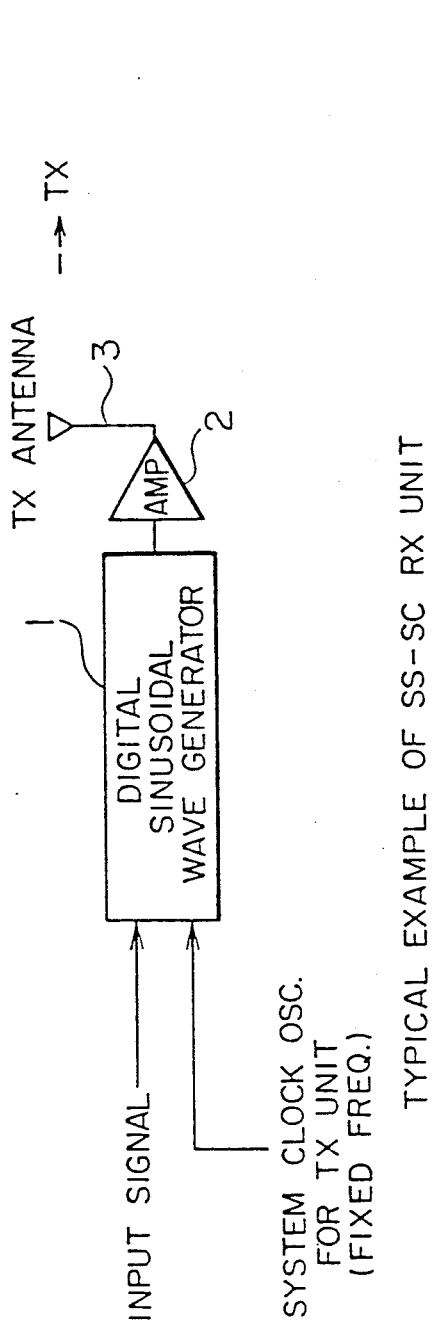
FIG. 1 a
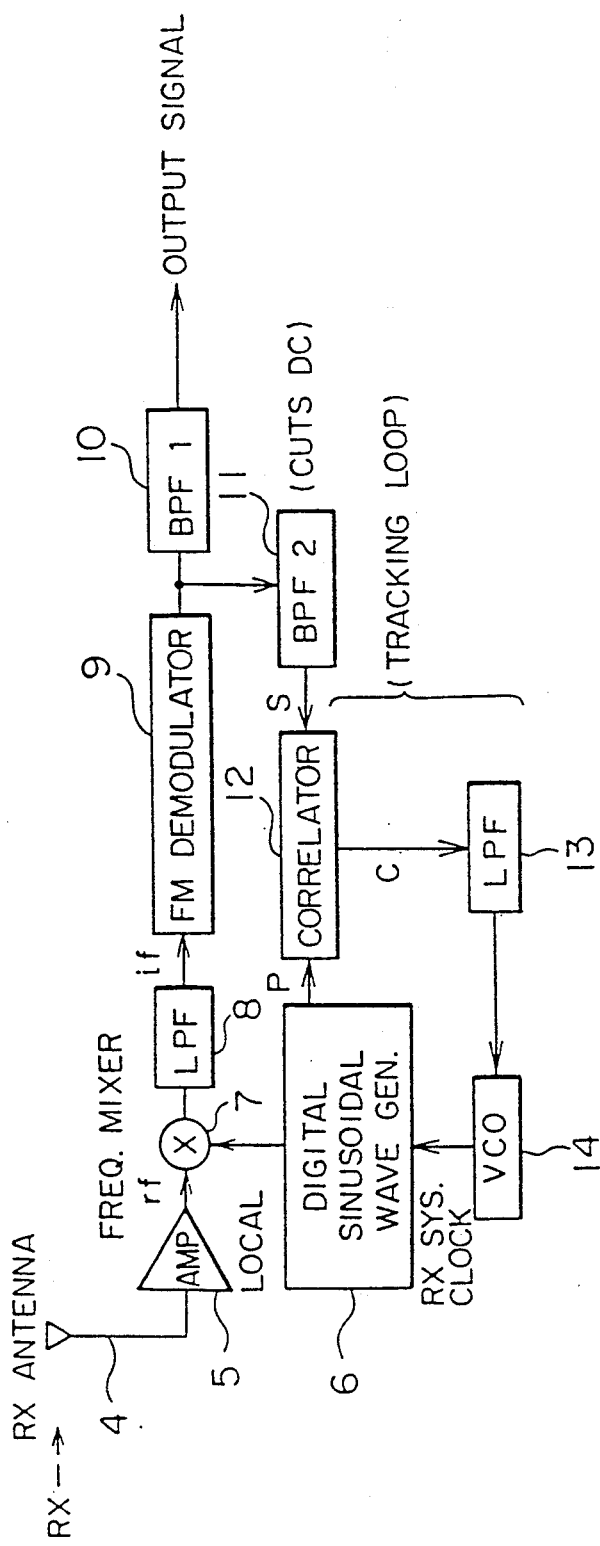
FIG. 1 b  TYPICAL EXAMPLE OF SS-SC RX UNIT

FIG. 2(a) PHASES OF Ri AND Lo
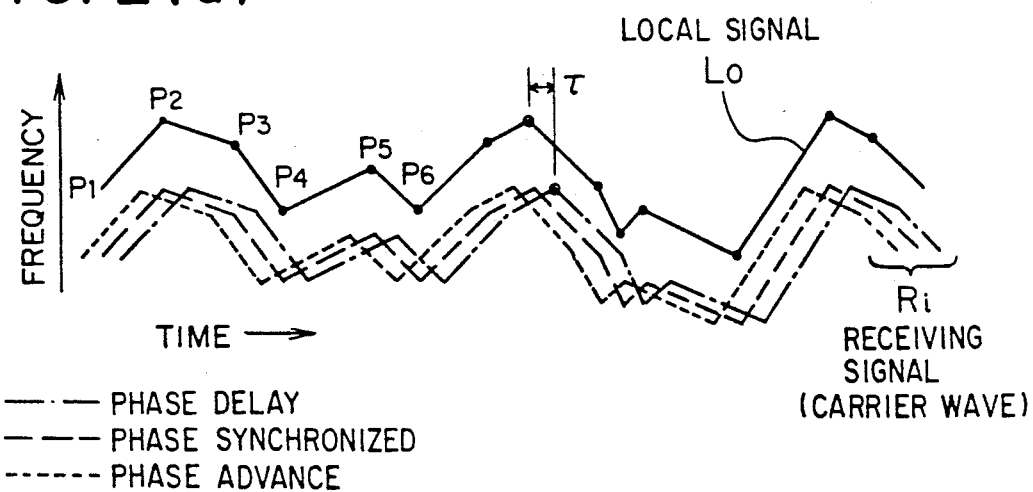
—·— PHASE DELAY
——— PHASE SYNCHRONIZED
------ PHASE ADVANCE
FIG. 2(b) S OUTPUT OF FM DEMODULATOR
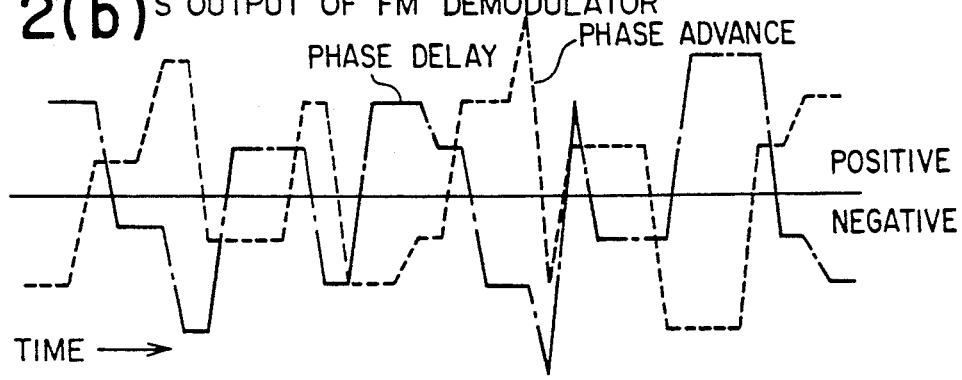
FIG. 2(c) P INPUT OF CORRELATOR
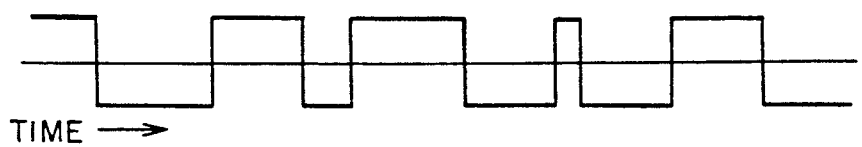
FIG. 2(d) C OUTPUT OF CORRELATOR
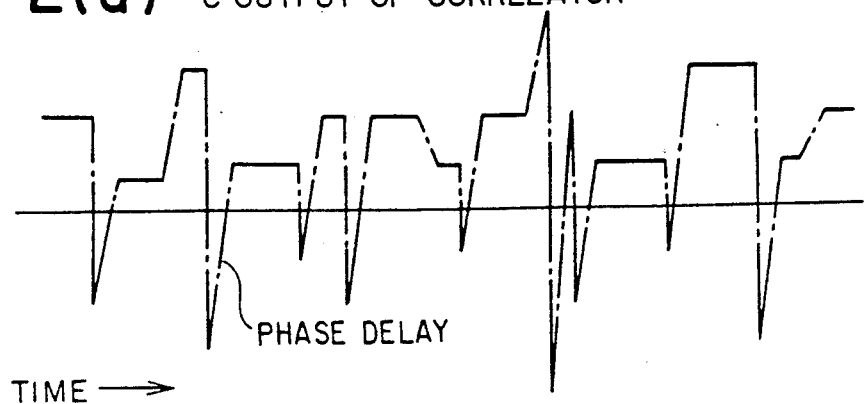

C OUTPUT OF CORRELATOR

PHASE ADVANCE

ANOTHER EXAMPLE OF SS-SC RX UNIT

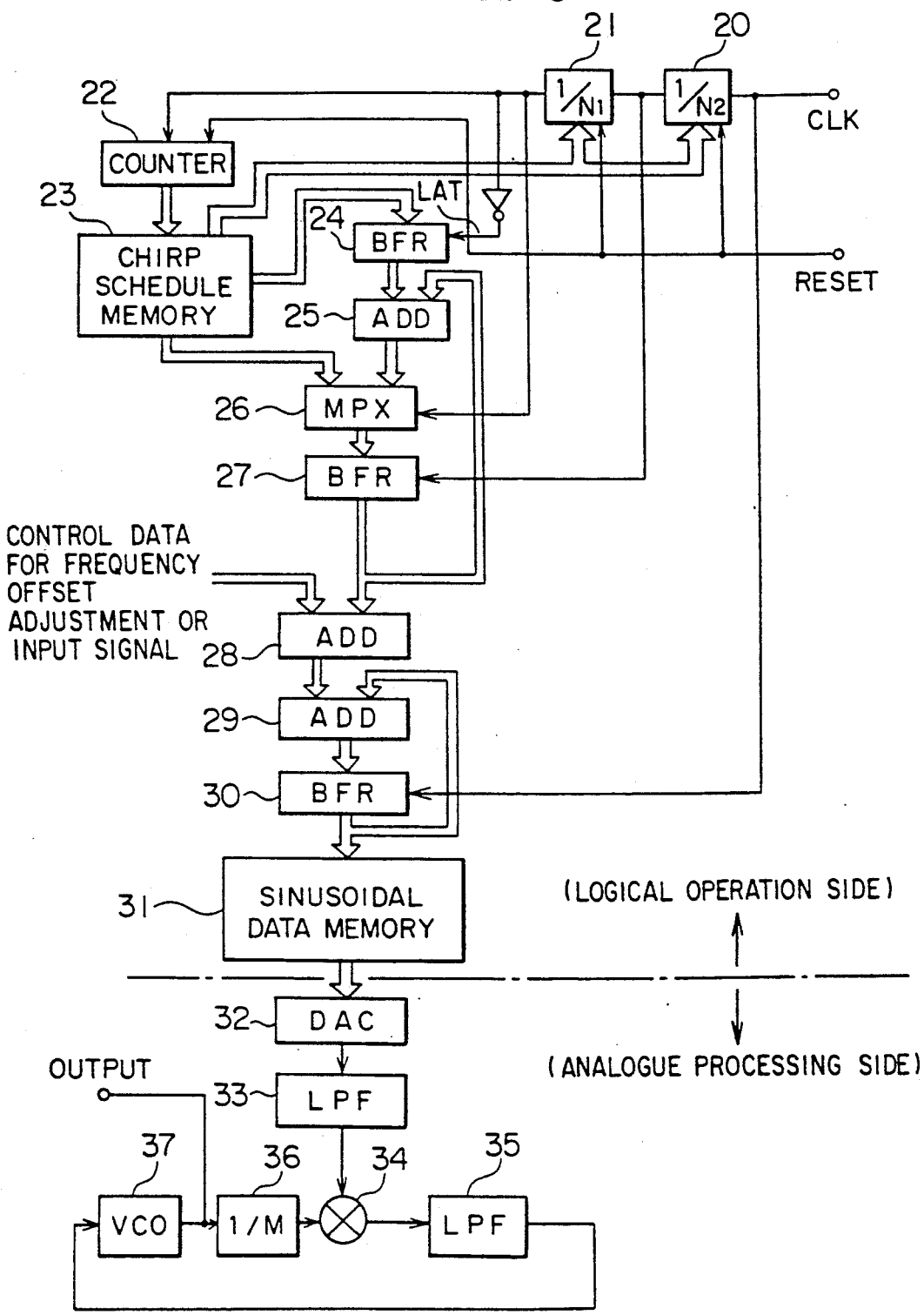

EXAMPLE OF CHIRP SEGMENT SEQUENCE MAP FOR 4 X 4 SEGMENTS

FREQUENCY CHANGE SCHEDULE DERIVED FROM THE MAP OF FIG.7a $$T = \left( \sum_{i=1}^{4} \tau_i \right) \times 4$$

AVERAGE SPECTRAL DENSITY OF THE SCHEDULE FIG.7b

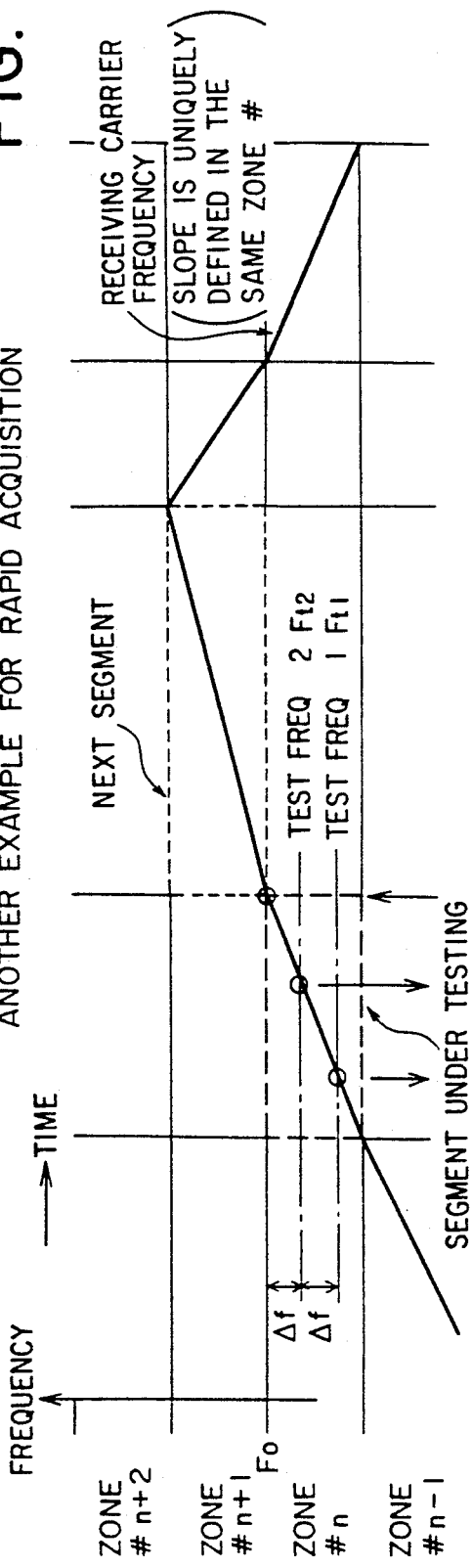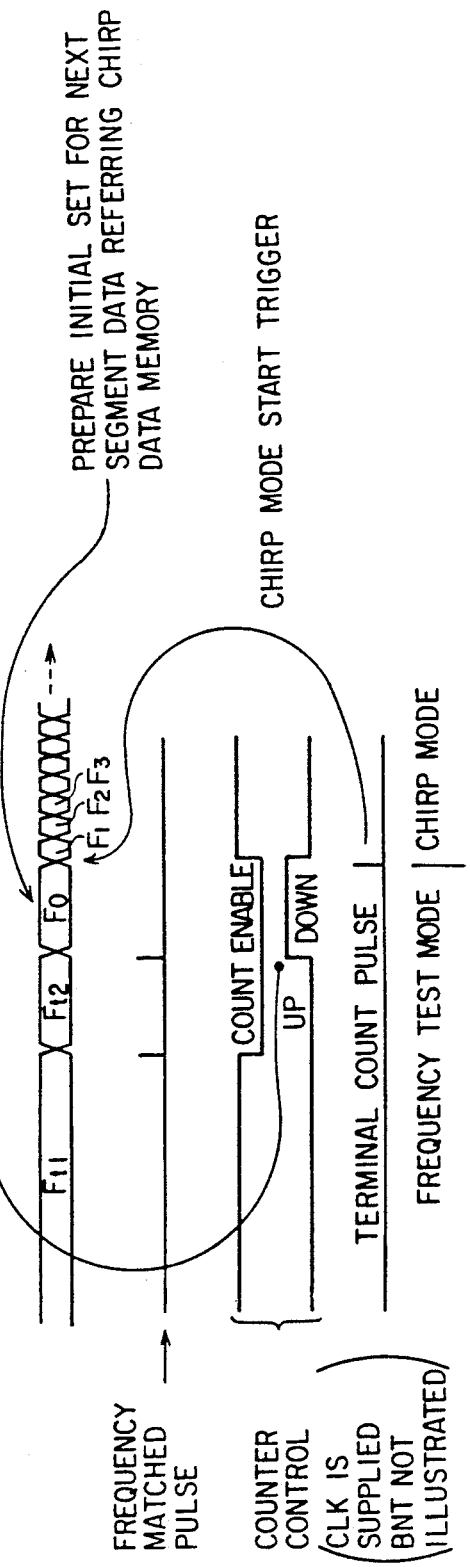
FIG. 9

SEQUENTIAL CHIRP MODULATION-TYPE SPREAD SPECTRUM COMMUNICATION SYSTEM

BACKGROUND OF THE INVENTION

1. Field of the Invention

This invention relates to a sequential chirp modulation-type spread spectrum communication system hereafter abridged as (SS-SC system), especially to the sequential chirp modulation-type spread spectrum communication system relating to FH-type which realizes fine transmission quality at low cost.

2. Description of the Related Art

A spread spectrum communication system (SS system) is known as a communication system having transmission characteristics resistant to variation. The spread spectrum communication system is a system which transmits a narrow band information signal to a transmitting channel after spreading the spectrum at a wide band by modulating with the PN (pseudo noise code) sequence having high clock frequency, detects correlatively the receiving signal at the receiving side, and obtains high S/N after demodulating by de-spreading the spectrum.

Since this spread spectrum communication system has some excellent advantages, e.g., its resistance to narrow band noise and the variation of transmission line characteristics (e.g., fading) and its higher secrecy, its applications to various fields has been investigated and developed.

The different kinds of SS communication systems are the DS system (direct sequence system), FH system (frequency hopping system), TH system (time hopping system), chirp system (pulse FM system) and hybrid system, but most of them are based on the DS system and FH system.

The DS system performs wide band transmission. Prior to the transmission, in the DS system carrier was first modulated by transmission signal, and then modulated by Pseudo-Random binary code sequences which has sufficient length and rapid bid rate, and demodulated the local signal by modulating again by BPSK, etc., using the same codes at the receiving side.

On the other hand, the FH system is a system which prepares a sufficient number of carrier wave frequency slots in the specified frequency area, changes the carrier wave frequency dispersedly (discontinuously) according to a predetermined schedule and demodulates this signal. This type has less problem about "near far problem" but the hard-ware cost is relatively high if higher hopping speed is used, because it is not possible to use single receiver using PLL synthsizer (lack of response time to frequency change requirement). Thus, it is necessary to use a multiple receiver that corresponds to frequency slots used in the system and the system reliability becomes lower because of the system complexity.

The processing gain (PG) for this system is defined simply by the number of frequency slot number in which the carrier hops. Therefore in the high speed hopping system, PG also pushes up the system hardware cost.

These two basic methods are often used in the mixed condition. It is called "hybrid type". The mixing enables further expansion of the communication bandwidth.

As the chirp system relates to this invention to some extent, it will be explained briefly as follows. The chirp system is a system which generates a signal whose frequency is gradually changed by a pulse sine wave during the pulse lasting period by SAW filter, and transmits and receives the signal. However, this system is only utilized for a radar system and it has not been used for general transmission.

SUMMARY OF THE INVENTION

The DS system is relatively simple in construction of circuits when compared to the FH system, and has an advantage in that it is easy to apply to digital technology.

Furthermore, since the DS system is based upon a relatively simple principle, it has the advantages of being easy to understand and resistant to multi-pass. On the other hand, this DS system has some defects; namely, it is easily affected by interference from near-by radio sources which is called the "near far problem", and has difficulty in synchronizing and so on.

On the other hand, although the FH system has such advantages as being able to easily take countermeasures against the "near far problem"; a more expensive frequency synthesizer which is capable of high speed switching is required in the system. Also, the FH system has many frequency slots and needs high speed hopping and thus it is difficult to reduce costs.

This invention's purpose is to solve the above mentioned problem, producing a carrier wave equivalent to the frequency hopping with a high speed which is not present in the former FH system technology by the economical construction of circuits and serving the sequential chirp modulation-type spread spectrum communication system which raises transmission performance.

This invention has sine wave generating means which can generate a sine wave whose frequency is gradually changed with the preprogrammed sequence according to the system clock at both the transmission and receiving side, and typically programmed so that the frequency of local sine wave signal on the receiving side is always higher in the specified frequency than that of the transmitting side under the synchronized condition. Therefore, the intermediate frequency of constant frequency is contained in the output of the mixer under the condition that the sine waves of both the transmission and receiving sides are perfectly synchronized.

FIG. 1 illustrates the system block diagram. In FIG. 1, the digital sine wave generators which are installed in the transmitter and receiver have essentially the same structure and independently generated coherent sine wave signals. The determined by frequencies of these signals are the same pre-programmed schedule according to each independent clock initially. In an out of phase condition no signal can be transmitted. If the clock frequencies are slightly different from each other, however, frequency change schedule timing slides relatively and when at last schedule timing coincides each other the frequency difference between TX/RX shows a constant value. Then the signal can be transmitted (demodulated).

This process is generally called "acquisition". The method described above is called the "sliding correlation method" and is a most simple one but requires much time to obtain acquisition. Other method is possible for SS-SC system to apply to obtain faster acquisition but is described later.

Once synchronized, the synchronization can be maintained by feeding back the correlative value between the fluctuation of intermediate frequency produced by the advancement or the delay between the receiving signal and the sine wave signal (local signal) sent from the digital sine wave generator means and the changing velocity of the sine wave frequency to the working clock of the digital sine wave generator means of the receiving side.

The above are the embodiments of this invention. This invention is a spread spectrum communication system which can generate a sine wave having a frequency which changes continuously and randomly by mounting the program controllable digital sine wave generator, and has a circuit construction which can match the phase of sine wave sent from the transmitting side rapidly with the generated sine wave. Therefore, this invention has the remarkable advantage that with a low cost circuit construction it can generate a sine wave equivalent to that generated by, as before done, hopping the frequency using the expensive frequency synthesizer.

Since the sine wave having a frequency which changes not only continuously but also discontinuously can be generated by using the two digital sine wave generators of this invention, switching them suitable and supplying the generated sine waves to the mixer, the secrecy of information can be kept more reliably.

BRIEF DESCRIPTION OF THE DRAWINGS

FIG. 1 (a) and (b) show schematically the transmitting side using the digital sine wave generator of this invention and the circuit diagram of the receiving side, respectively.

FIG. 6 shows a minute diagram of the digital sine wave generator of this invention.

FIG. 7b shows a concrete example according to the schedule shown in FIG. 7a.

FIG. 9 shows another example for Rapid Acquisition System.

DESCRIPTION OF THE PREFERRED EMBODIMENTS

Figure 2E:
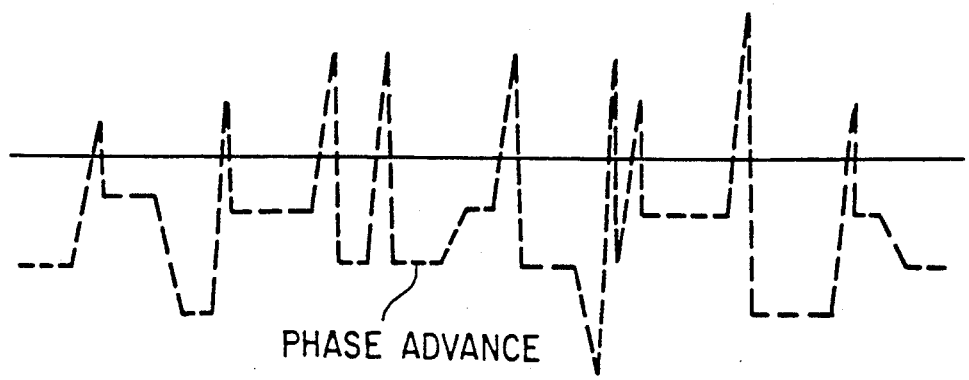
FIG. 2 (a) to (e) show the diagrams of the waveforms explaining the action of FIG. 1.

FIG. 1 (a) and (b) shows the basic construction of the chirp modulation-type spread spectrum system of this invention.

FIG. 1 (a) shows a rough sketch of the transmitting side having a digital sine wave generator 1 as later explained, and FIG. 1 (b) shows the construction of the receiving side. In this figure, 1 is the digital sine wave generator of the transmitting side, 2 is the electrical power amplifier, 3 is the transmitting antenna, 4 is the receiving antenna, 5 is the amplifier, 6 is the digital sine wave generator of the receiving side, 7 is the mixer, 8 is the low pass filter, 9 is the FM demodulator, 10 is the primary band-pass filter, 11 is the secondary band-pass filter, 13 is the low pass filter and 14 is the voltage controlled oscillator (VCO), respectively.

In activation, the transmitting signal which is spread modulated by the digital sine wave generator 1 of the transmitting side is transmitted by the antenna 3 through the amplifier 2.

In the receiving side, the signal received by the antenna 4 is mixed with the sine wave sent from the digital sine wave generator 6 by the mixer 7, and generated through the primary band-pass filter 10 after demodulation of this intermediate frequency signal by the FM demodulator 9 through the low pass filter 8.

A portion of the demodulated signals are supplied to one of the inputs of a correlator 12 through the secondary band-pass filter 11. Since the slope polarity bit signal of the local signal sent from the digital sine wave generator 6 is supplied to another input of the correlator 12, the correlated output of both signals is generated. The correlated output generated in this way is supplied to the VCO 14 through the low pass filter 13, and generates the system clock sent to the digital sine wave generator 6. Consequently, a code tracking loop is formed by the digital sine wave generator 6, correlator 12, low pass filter 13 and VCO 14. The loop syncronizes the phase of the local (RX) system clock and transmitter system clock to maintain a constant frequency difference between Tx and Rx.

Even if the phase of the receiving signal is shifted forward or backward to the local signal sent from the digital sine wave generator 6 after these signals are synchronized, the synchronization is maintained by feeding back the system clock with the correlated output from the correlator 12.

Figure 3:
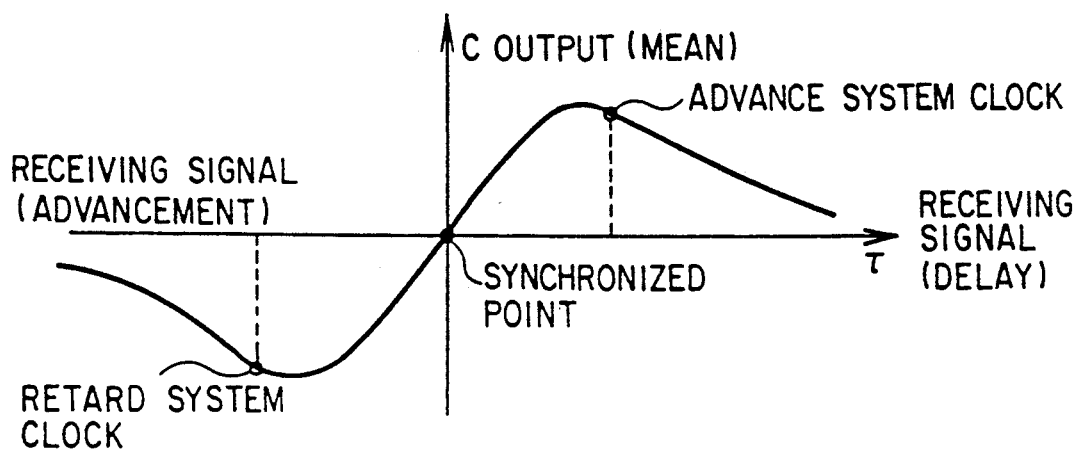
FIG. 3 shows the figure of the output characteristics sent from the correlator shown in FIG. 1 (b).

FIG. 2 (a), (b), (c) and (e) show the timings of waveforms in each component of the apparatus shown in FIG. 1. As shown in that figure, the detection output (demodulated output) of FM demodulator 9 results in positive or negative detection output (FIG. 2 (b)) depending on whether the phase of the receiving signal Ri is advanced to or delayed from going to the local signal Lo. On the other hand, local signal P is generated by the digital sine wave generator 6 (FIG. 2 (c)), and an output corresponding to $C = S \cdot P$ is obtained from the correlator 12 since the detection output S and the local signal P are supplied to the correlator 12 (FIG. 2 (d) or (e)). For example, the output of the correlator in the case that the receiving signal is delayed, are shown in FIG. 2 (d) and a part of the output of the correlator in the case that the receiving signal is advanced are shown in FIG. 2 (e). A positively changed output appears depending on the level of the delay of the receiving signal to the local signal, and the negatively changed output appears depending on a level of the advancement of the receiving signal in FIG. 2 (e). FIG. 3 shows these conditions. Therefore, as shown in FIG. 3, the phase of the signal output from the digital sine wave generator 6 is adjusted to that of the receiving signal by lowering the system clock in the positive area when the receiving signal is delayed, and raising the system clock in the negative area when the receiving signal is advanced.

Figure 4:
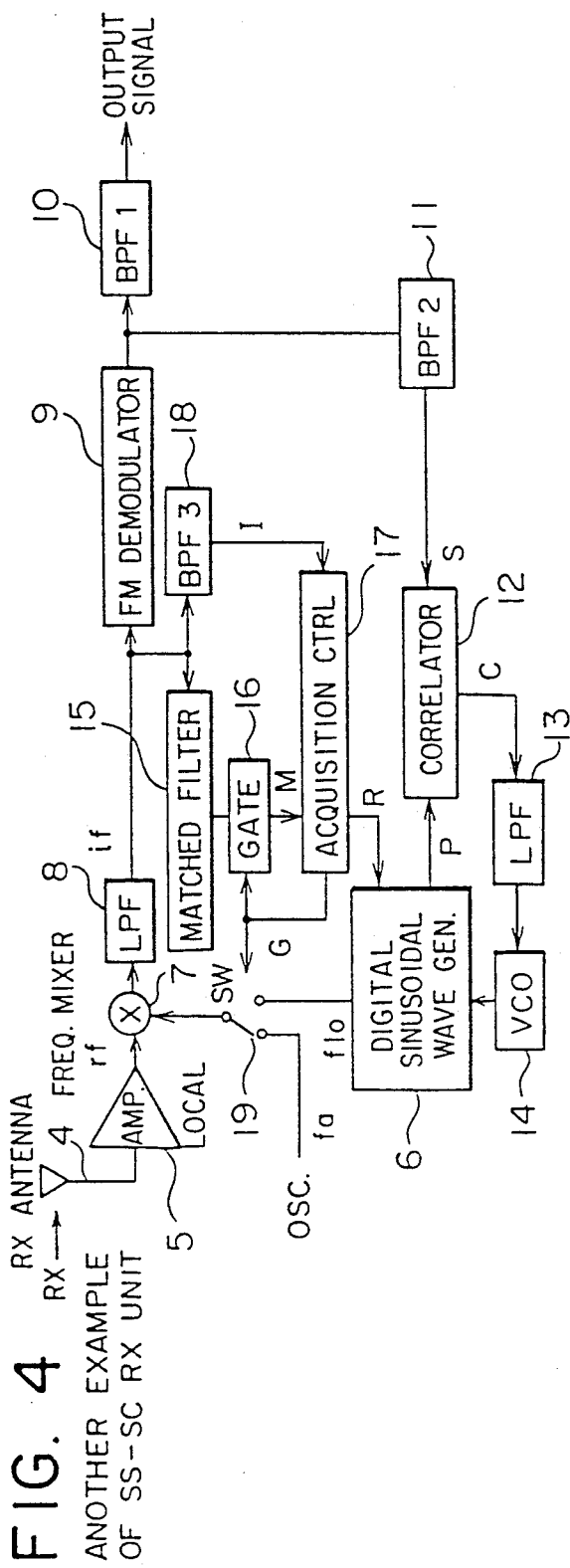
FIG. 4 shows the second embodiment.

FIG. 4 shows another (the second) embodiment of this invention. In this embodiment, the matched filter 15, the gate 16, the Acquisition controlling part 17, the resonance circuit 18 and the switch 19 are mounted. The remaining reference numbers refer to the same components in FIG. 4 as are reffered to in FIG. 1 (b).

Figure 5:
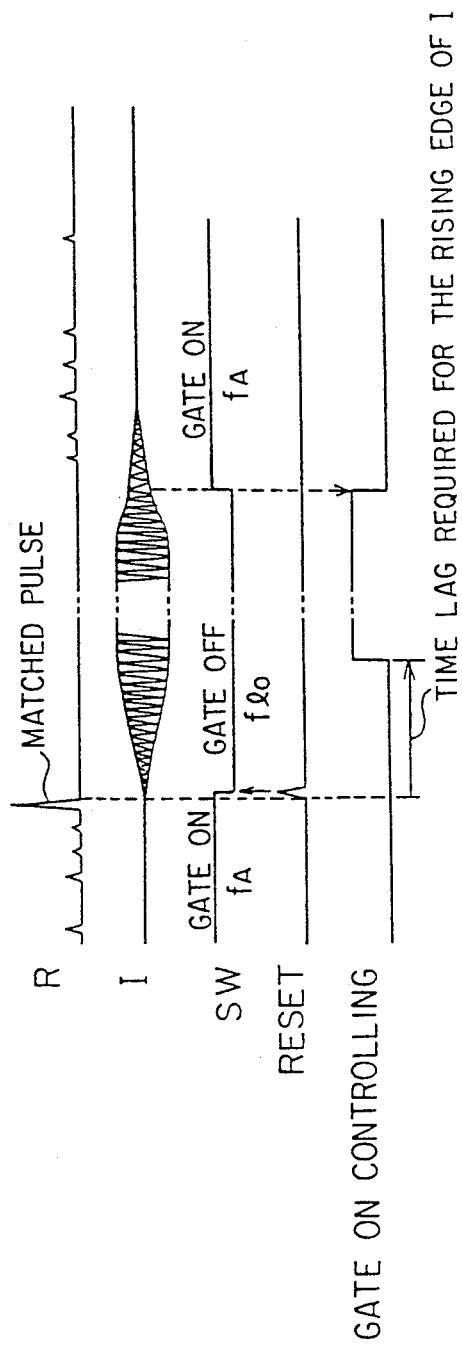
FIG. 5 shows the timing of action of FIG. 4.

The action of the circuit shown in FIG. 4 is explained by referring to the timing chart shown in FIG. 5. In case the receiving signal is not synchronized, the switch 19 is turned to the side in which the constant frequency is impressed in the mixer 7, and the gate opens at this time. When the matched pulse R is detected by the matched filter 15, it is supplied to the Acquisition controlling part 17 and the gate 16 is closed by the SW signal sent from the controlling part 17. At the same time the switch 19 is turned to the output side of the digital sine wave generator 6, and an intermediate frequency signal I is generated after impressing the sine wave signal whose phase is synchronized with that of the sine wave of the receiving signal to the mixer 7 from the digital sine wave generator.

The Acquisition controlling part 17 watches the signal I generated from the resonance circuit 18 for a definite period of time, and synchronizes the waves by opening the gates and again detecting the matched pulse when the signal I is not detected indicating the desynchronization of waves.

FIG. 6 shows the detailed construction of the digital sine wave generator used in the transmitting and receiving apparatus.

In this figure, 20 and 21 are the dividers, 22 is the counter, 23 and 31 are the memories, 24, 27 and 30 are the accumulators, 25, 28 and 29 are the adders, 26 is the multiplexer, 32 is the D/A converter, 33 and 35 are the low-pass filters, 34 is the mixer, 36 is the divider and 37 is the voltage controlled oscillator.

Next, the action of the digital sine wave generator is explained.

The slope data for producing the waveform of local signal Lo as shown in FIG. 2 (a) are added by the adder 25 by obtaining it from the memory and storing it in the accumulator 24 after designation of the address of memory 23 by the counter 22. The obtained results and the initial data are stored in the accumulator 27 through the multiplexer 26. That is, the data corresponding to the lines linking to each point P1, P2, P3, P4 ... Pn of the waveform of the local signal Lo as shown in FIG. 2 (a) are generated in the accumulator 27.

Next, the data accumulated in the accumulator 27 are added to the shift data by the adder 28 and the sine wave data stored digitally in the memory (ROM) 31 corresponding to the phase of that time are read out by adding the value of the output of accumulator 30 which stores the data corresponding to the phase to the result output of aforementioned adder 28.

These digital data obtained in this way are converted analoguely through the D/A converter 32, impressed by the mixer 34 through the low pass filter 33, mixed with the output of divider 36 which divides the output of the voltage controlled oscillator 37 and generated as an output signal having a high changing rate.

As a result, the digital sine wave generator of the receiving side of this invention supplies the prescribed sine curve which is digitally composed after D/A conversion to the circuit of the analogue processing side composing PLL circuit as a reference signal and synchronizes it with the sine wave of the receiving signal by generating the local sine wave signal.

Figure 7A:
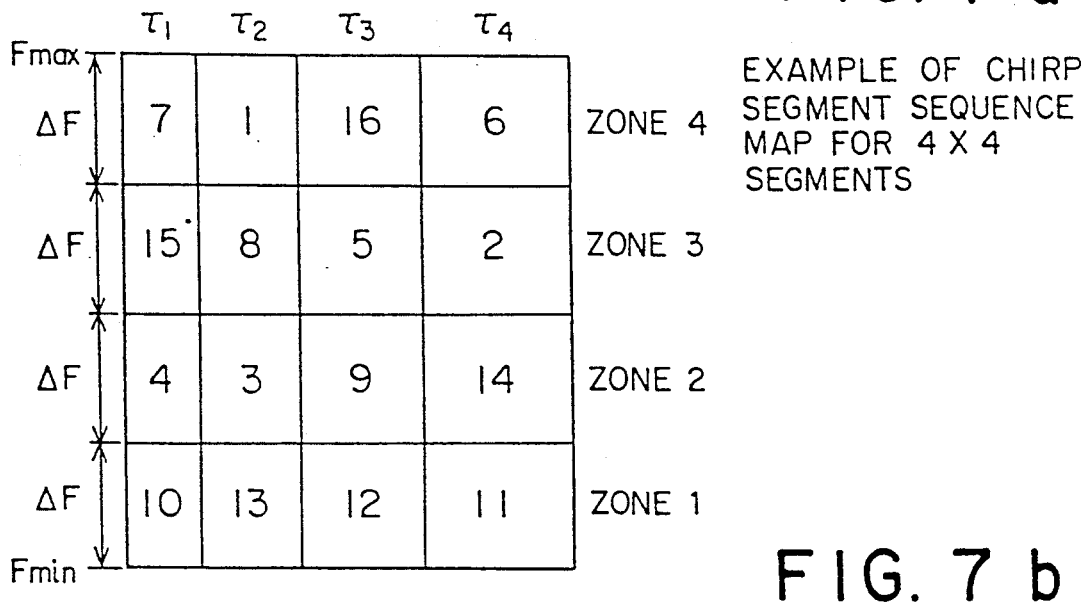
FIG. 7a shows the chirp schedule diagram forming the rectangular spectrum in the spread spectrum communication.
Figure 7B:
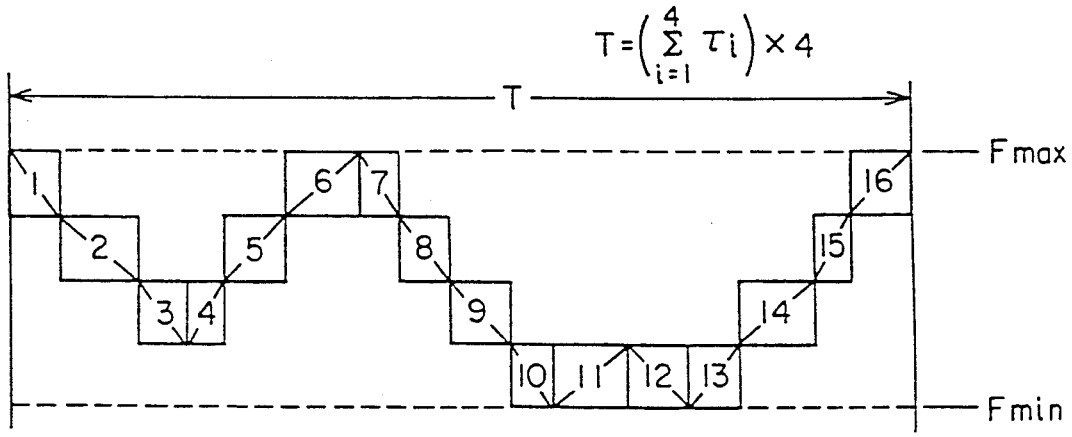
Figure 7C:
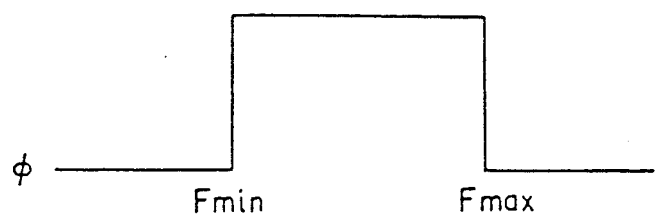
FIG. 7c shows the mean spectral density wave of the out-put signal in FIG. 6.

FIG. 7 shows determing process of frequency change schedule. In this system the sine wave frequency changes in the manner like "random walk". The simplest way to determine this schedule is to devide the full frequency range into several frequency zone ( K ) and assign ( L ... must be even number) individual cells for each frequency zone where the height of each single cell corresponds to (Fmax-Fmin)/k and the width of each cell corresponds to the duration time of each cell. Thus ( K x L ) cells can be arranged in the rectangular area like FIG. 7a. Then each cell is numbered randomly in the manner to make a diagonal line of each element connect together (FIG. 7a). Finally each cell is relocated in the time-series and then the frequency change schedule will be made by connecting the diagonal line of each cells (FIG. 7b). The average spectral density for the schedule in FIG. 7b is written in FIG. 7c. We define the term "chirp segment" for this cell.

Figure 8:
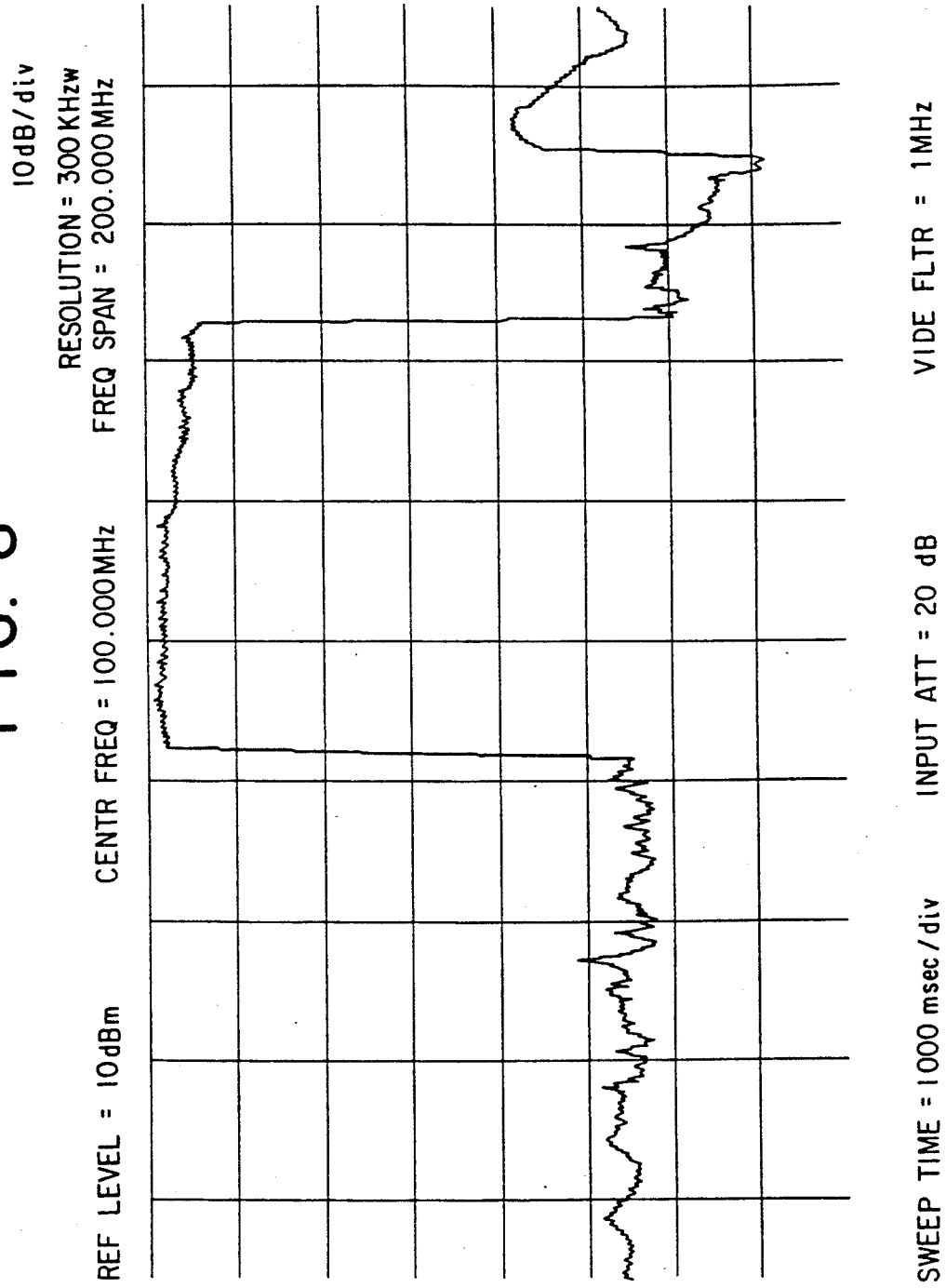
FIG. 8 shows an example of the spectral density measured by spectral analyzer.

FIG. 8 shows an example of the actual spectrum of another frequency change pattern obtained by spectrum analyzer.

FIG. 9 is another example of rapid acquisition system. In this system unique frequency change speeds are assigned to each segment among the same frequency zone. Thus one can know the current segment number under receiving if the current frequency and current frequency change speed are known. To do this the system in FIG. 9 uses at least two test frequencies in the same frequency zone. As the most simple example FIG. 9 has only two test frequencies.

One can receive a pulse signal if the frequency difference between the incoming signal and the local test frequency signal (constant) coincides to the system intermediate frequency. In this moment current frequency belongs to the same frequency group with the test frequency. This pulse will be generated at least two times within a cycle time of a frequency change schedule.

In the same way the next pulse can be received if the test frequency is changed to another frequency. If this 2-nd test frequency belongs to the same frequency group with the 1-st test frequency, and if the time interval between 1-st and 2-nd pulses is measured then one can identify which segment signal has been received (because it is assigned uniquely).

In the example of FIG. 9 the difference between the 1-st and 2-nd test frequency is set equal to the difference between 2-nd test frequency and the start frequency of the next segment. By this configuration its very simple to set the start timing of the next segment. The time interval counter counts up between the 1-st pulse and 2-nd pulse then the counter direction is changed and counts down. The start timing of the next segment can be known by the counter value returning to the initial value.

The reliability of acquisition process can be refined by adding a segment verifying process with more test frequencies to the example of FIG. 9.

What is claimed is:

1. A sequential chirp modulation-type spread spectrum communication system comprising:

a transmitter including (i) a primary digital sine wave generator of program-controlled type, said primary digital sine wave generator generating a sine wave having frequency that changes substantially continuously and pseudorandomly in a specified range of frequency according to a program; (ii) a means for modulating said sine wave produced by said primary sine wave generator; and (iii) means for transmitting said sine wave after modulating said sine wave with selected signals which are to be transmitted; and a receiver including (i) a secondary digital sine wave generator of program-controlled type, said secondary digital sine wave generator generating a secondary sine wave having a constant frequency difference from said frequency of said sine wave generated by said primary digital sine wave generator; (ii) means for receiving said modulated sine wave from said transmitting mean; and (iii) means for demodulating said modulated sine wave received from said transmitting means with said secondary sine wave.

2. The sequential chirp modulation-type spread spectrum communication system according to claim 1, wherein said secondary digital sine wave generator is controlled independently from said primary digital sine wave generator by an independently stored program at said receiver.

3. A sequential chirp modulation-type spread spectrum communication system comprising:
 a transmitter including (i) a primary digital sine wave generator of a program-controlled type for generating a sine wave; (ii) a means for modulating said sine wave produced by said primary digital sine wave generator; and (iii) a means for transmitting said sine wave after modulating said sine wave with selected signals which are to be transmitted; and
 a receiver including (i) a secondary digital sine wave generator of program-controlled type for generating a secondary sine wave; (ii) a mixer for generating an intermediate frequency signal after receiving a sine wave input sent from said secondary sine wave generator of the receiver and transmitted information modulated by a sine wave sent from said primary digital sine wave generator of the transmitter as a transmitted signal to the receiver; (iii) a demodulator for demodulating the transmitted signal by receiving the intermediate frequency signal sent from said mixer and (iiii) a correlator generating a correlating output after receiving a code signal and output sent from said demodulator, said correlating output serving to change a clock frequency of said secondary digital sine wave generator by controlling a system clock that impresses said secondary digital sine wave generator at a region between positive and negative peaks of said correlating output and thereby demodulates information by synchronizing the phase of frequency changing pattern sent from said secondary digital sine wave generator with the phase of said frequency changing pattern of said received signal.

4. A sequential chirp modulation-type spread spectrum communication system according to claim 3, wherein said receiver further includes:
 a matched filter for detecting a matched pulse of said transmitted signal;
 a gate means for controlling a passing of an output sent from said matched filter; and
 an acquisition means for resetting said secondary sine wave generator when said matched pulse is detected and acquiring a synchronization of said secondary sine wave and the transmitted signal.

5. A sequential chirp modulation-type spread spectrum communication system according to claim 3 that includes a feed back control means that raises the frequency of the system clock which is supplied to said secondary digital sine wave generator at a positive region of said correlating output and lowers the frequency of the system clock at a negative region of said correlating output.

6. A sequential chirp modulation-type spread spectrum communication system according to claim 5 including means for identifying an incoming signal pattern phase by detecting a speed at which incoming signal frequency changes are taking place which is assigned uniquely too a chirp segment.

* * * * *